(12) United States Patent
Sloan et al.

(10) Patent No.: US 9,234,108 B1
(45) Date of Patent: Jan. 12, 2016

(54) LED CURABLE INK SYSTEM FOR MULTI COLORED SUB-SURFACE APPLICATIONS

(71) Applicant: Donald D. Sloan Trust

(72) Inventors: Donald D. Sloan, Platte City, MO (US); Amy Hohenadel, Kansas City, MO (US)

(73) Assignee: Donald D. Sloan, Trustee of the Donald D. Sloan Trust, Platte City, MO (US)

( * ) Notice: Subject to any disclaimer, the term of this patent is extended or adjusted under 35 U.S.C. 154(b) by 0 days.

(21) Appl. No.: 14/533,800

(22) Filed: Nov. 5, 2014

Related U.S. Application Data

(63) Continuation of application No. 13/653,153, filed on Oct. 16, 2012, now abandoned.

(51) Int. Cl.
| | |
|---|---|
| *B41M 5/00* | (2006.01) |
| *C09D 11/322* | (2014.01) |
| *C09D 133/14* | (2006.01) |
| *C09D 133/08* | (2006.01) |
| *C09D 183/04* | (2006.01) |
| *B44C 1/17* | (2006.01) |
| *B44C 1/10* | (2006.01) |
| *B41M 5/42* | (2006.01) |
| *B41M 5/52* | (2006.01) |

(52) U.S. Cl.
CPC ............... *C09D 11/322* (2013.01); *B41M 5/42* (2013.01); *B41M 5/52* (2013.01); *B41M 5/5218* (2013.01); *B41M 5/5254* (2013.01); *B44C 1/105* (2013.01); *B44C 1/1704* (2013.01); *C09D 133/08* (2013.01); *C09D 133/14* (2013.01); *C09D 183/04* (2013.01)

(58) Field of Classification Search
CPC ........ B41M 5/42; B41M 5/52; B41M 5/5254; B41M 5/5218; B44C 1/105; C09D 11/322; C09D 133/14; C09D 133/08; C09D 183/04
See application file for complete search history.

(56) References Cited

U.S. PATENT DOCUMENTS

| 5,468,532 | A | 11/1995 | Ho et al. |
| 6,207,268 | B1 | 3/2001 | Kosaka et al. |
| 7,662,224 | B2 | 2/2010 | Sloan |
| 2003/0083396 | A1* | 5/2003 | Ylitalo ................. G09D 11/101 522/74 |
| 2007/0084372 | A1* | 4/2007 | Sloan ............................ 101/454 |

OTHER PUBLICATIONS

The Office Action dated Nov. 4, 2013, in the corresponding U.S. Appl. No. 13/653,153, filed Oct. 16, 2012.
The Office Action dated May 5, 2014, in the corresponding U.S. Appl. No. 13/653,153, filed Oct. 16, 2012.

* cited by examiner

*Primary Examiner* — Betelhem Shewareged
(74) *Attorney, Agent, or Firm* — Hovey Williams LLP

(57) ABSTRACT

A graphics display system is provided in which a graphics layer is printed upon a transparent substrate. An adhesive is generally applied over the graphics layer so that the graphics display system may be permanently affixed to a support. The graphics layer may be digitally printed upon the substrate using one or more UV-curable inks formulated to provide excellent adhesion to the substrate and resistance to degradation by the adhesive. The inks are capable of curing by UV radiation emitted from an LED array as opposed to conventional mercury vapor lamps.

11 Claims, 1 Drawing Sheet

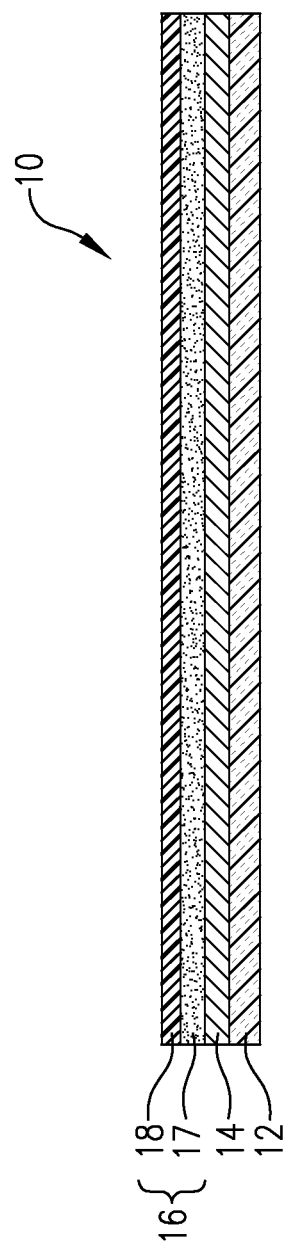

LED CURABLE INK SYSTEM FOR MULTI COLORED SUB-SURFACE APPLICATIONS

RELATED APPLICATION

The present application is a continuation of U.S. patent application Ser. No. 13/653,153, entitled LED CURABLE INK SYSTEM FOR MULTI-COLORED SUB-SURFACE APPLICATIONS, filed Oct. 16, 2012. The above application is incorporated by reference herein.

BACKGROUND OF THE INVENTION

1. Field of the Invention

The present invention is directed toward a graphics display system in which a graphics layer is printed upon a transparent substrate so that the graphics are visible therethrough. The inks used to create the graphics layer exhibit excellent adhesion to substrates, such as polycarbonate, and resist degradation by adhesives that might otherwise cause the graphics layer to delaminate from the substrate. In particular embodiments, the inks used to create the graphics layer are UV-curable digital inks capable of being printed onto the substrate by an inkjet printer.

2. Description of the Prior Art

Polycarbonate membrane displays are used in a variety of applications in many industries. Because of its durability, polycarbonate is a good material for use in high-performance environments. Moreover, because it is transparent, one can place an image on the underside, or sub-surface, of the polycarbonate sheet and the image will be protected against damage or wear. Polycarbonate membranes have been employed as overlays in the manufacture of membrane switches which are oftentimes required with withstand millions of switch activations over the product's lifetime. Polycarbonate membrane displays are also typically attached to a mounting surface through the use of a permanent adhesive. Because the image is printed on the sub-surface of the membrane, the ink comes into direct contact with the adhesive. If the adhesive and ink are not properly formulated to be compatible with each other, the adhesive can re-wet the ink thereby resulting in delamination of the ink, and adhesive, from the polycarbonate substrate.

Polycarbonate membrane displays have also been used in the construct of backlit displays, such as those found in automotive interiors. In a backlit display, certain portions of the polycarbonate membrane display are opaque or "blacked out" so that light is permitted to pass through only certain parts of the display. In order to deliver the required opacity, the inks printed upon the polycarbonate membrane must have a high solids and pigment levels. Therefore, such inks have typically been of the screen-printed variety.

Inkjet printing offers the capability to produce on-demand graphics of very high quality. However, until now, digital inks have not been able to provide the performance characteristics necessary to successfully print polycarbonate membrane displays. Presently available digital inks are susceptible to adhesive migration in which the solvents from the adhesive attack and re-wet the ink. This can lead to degradation of image quality over time and failure of the display due to ink delamination. Furthermore, because digital inks are fired through very small nozzles in the inkjet head, it is very difficult to construct an ink having sufficient opacity for use in polycarbonate membrane displays.

In some applications for polycarbonate membrane displays, the membrane may need to be thermally formed into a desired shape, or embossed. Therefore, inks that are highly crosslinked will not stretch or elongate during thermal processing or embossing thereby resulting in the degradation of the graphic's quality.

Accordingly, there is a need in the art for an ink system that can be digitally printed onto a transparent substrate for use in graphics display systems that exhibit excellent adhesion to the substrate, resist adhesive migration, and are capable of elongation along with the substrate during thermal processing.

SUMMARY OF THE INVENTION

According to one embodiment of the present invention there is provided a laminate graphics system comprising a thin transparent substrate, a graphics layer printed thereon, and an adhesive layer applied over the graphics layer. The substrate typically comprises a synthetic resin material, and in particular embodiments, a polycarbonate material. The graphics layer is printed on the substrate using at least one UV-curable ink, which is subsequently cured. The UV-curable ink, prior to being cured, comprises one or more acrylate oligomers, one or more reactive diluents, one or more acrylate monomers, one or more photoinitiators, and a pigment. The graphics layer exhibits excellent adhesion to the substrate, and in particular embodiments, the graphics layer adheres more strongly to the substrate than to the adhesive layer.

According to another embodiment of the present invention there is provided a UV-curable ink formulated for use in the manufacture of thin synthetic resin membrane graphics display systems having an adhesive backing. The ink comprises one or more acrylate oligomers, one or more reactive diluents, one or more acrylate monomers, one or more photoinitiators, and a pigment. The ink exhibits excellent adhesion to polycarbonate substrates, and when applied to such a substrate and subjected to a cross hatch tape test according to ASTM D-3359, does not delaminate from the substrate.

According to another embodiment of the present invention there is provided a method of forming laminate graphics systems comprising the steps of providing a relatively thin transparent substrate, printing a graphics layer onto the substrate with at least one UV-curable ink, and exposing the at least one UV-curable ink to a source of UV radiation thereby causing the ink to cure on the substrate. The substrate generally comprises a synthetic resin material such as polycarbonate. The one or more inks that are printed on the substrate can be any of the inks described herein. Once printed, the substrate bearing the graphics layer is exposed to a source of UV radiation thereby causing the UV-curable ink to cure on the substrate. In particular embodiments, the ink is printed on the substrate using an inkjet printer.

BRIEF DESCRIPTION OF THE DRAWINGS

FIG. 1 is a schematic representation of an exemplary graphics display system in accordance with the present invention.

DETAILED DESCRIPTION OF THE PREFERRED EMBODIMENT

Thin film systems having subsurface graphics can be used in a number of applications where it is desirable to protect the graphic from physical damage. For instance, certain devices are equipped with membrane switches designed to be actuated by the user. If the graphic were located on the outer surface of the membrane switch, repeated contact by the user would eventually degrade or cause the graphic to wear to the point that the graphic is rendered useless. By placing the graphic on the underside of the film, it will not see such direct contact. Rather, user contact will occur directly with the more durable synthetic resin film.

Particular applications for thin film graphics display systems include devices comprising the aforementioned membrane switches, as well as a number of automotive applications, and particularly, automotive interior fixtures such as dashboards and instrument clusters. In certain applications, the graphics display systems are configured to be illuminated from behind. Thus, the system may comprise a transparent substrate and translucent graphics layers which permit light to pass through.

FIG. 1 illustrates an exemplary graphics display system 10 made in accordance with the present invention. System 10 generally comprises a substrate 12 upon which a graphics layer 14 is printed. Substrate 12 is preferably sufficiently transparent so that graphics layer 14 is visible therethrough. Exemplary substrate materials include polycarbonates (e.g., LEXAN), polyethylene terephthalate, including PET-G, acrylonitrile butadiene styrene (ABS), polyethylene, and polypropylene. The thickness and hardness of the substrate material can vary depending upon the desired application for the graphics display. For example, with membrane switches, it is desirable for the substrate to comprise a thin sheet or membrane material that is relatively flexible and will take embossing. In other applications, such as automotive interior parts, the substrate may be thicker and relatively more rigid and be capable of being molded or thermoformed. In certain embodiments, polycarbonate is a preferred substrate given its hardness and processability. Polycarbonate has a glass transition temperature ($T_g$) of about 147° C., thus any forming operation will require the substrate to be heated above this temperature.

While possessing many desirable characteristics, successful direct printing of an ink image onto polycarbonate has been a difficult. As discussed further below, graphics system 10 further comprise an adhesive layer 16 directly applied over graphics layer 14. Many times the adhesives used in adhesive layer 16 contain solvents that can attack the inks used in graphics layer 14 thereby causing them to delaminate from the polycarbonate substrate. The present invention solves this problem and provides an ink having good chemical resistance and adhesion characteristics to polycarbonate.

Graphics layer 14 is directly printed on substrate 12, preferably using an inkjet printer. Graphics layer 14, therefore, is printed using one or more inks, particularly UV-curable digital inks. The inks for use in forming graphics systems 10 generally comprise one or more acrylate oligomers, one or more reactive diluents, one or more acrylate monomers, one or more photoinitiators, and a pigment. A number of optional additives may also be used to give the ink formulations other desirable characteristics such as surfactants, viscosity modifying agents, and coupling agents.

The acrylate oligomer can be a monofunctional or multifunctional oligomer (e.g., difunctional or trifunctional). As used herein, the term "oligomer" refers to two or more reacted monomers. It is also understood that the term "oligomer" refers to both reacted monomeric chains that are capable of further reaction and reacted monomeric chains that are considered to have no further substantial reactivity. In certain embodiments, the molecular weight and $T_g$ of the oligomer component of the ink is an important characteristic. In some applications, it is preferable to closely match the $T_g$ of the oligomer with the $T_g$ of the resins contained in the adhesive of adhesive layer 16. In particular embodiments, the $T_g$ of at least one oligomer in the ink formulation is between about −50° C. to about 0° C. or between about −40° C. to about −25° C. In other embodiments, at least one oligomer in the ink formulation has a slightly higher $T_g$, between about 0° C. to about 75° C. or between about 20° C. to about 50° C. In still other embodiments, at least one oligomer in the ink formulation has a $T_g$ above 90° C. or between about 90° C. to about 120° C. Moreover, certain ink formulations made in accordance with the present invention may comprise two or more oligomers having significantly varying $T_g$ values. For example, the ink formulation may include one oligomer having a $T_g$ within the range of −40° C. to −25° C., and another oligomer having a $T_g$ within the range of 20° C. to about 50° C. With respect to molecular weight, in certain embodiments the oligomer has a molecular weight of at least 500 g/mol, between about 500 to about 5000 g/mol, between about 800 to about 4500 g/mol, or between about 1500 to about 4000 g/mol.

Exemplary acrylate oligomer compounds that may be used in formulating inks according to the present invention include polyester polyurethane acrylate oligomers such as: CN991 from Sartomer (a polyester-based polyurethane diacrylate oligomer, MW=800-1000 g/mol, $T_g$=27° C.), CN966H90 from Sartomer (an aliphatic polyester based urethane diacrylate oligomer blended with 10% 2(2-ethoxyethoxy) ethyl acrylate, MW=3000-4000 g/mol, $T_g$=−35° C.), CN 983 from Sartomer (an aliphatic polyester based urethane diacrylate oligomer, MW=<500 g/mol, $T_g$=92° C.), and CN973J75 from Sartomer (an aromatic polyester based urethane diacrylate oligomer blended with 25% isobornyl acrylate, MW=3000-4000 g/mol, $T_g$=−31° C.).

The one or more oligomers of the ink formulation may be present therein at a level of between about 5% to about 50% by weight, between about 7.5% to about 40% by weight, or between about 10% to about 25% by weight.

The acrylate monomers, like the oligomers, can be monofunctional or multifunctional (e.g., di- or trifunctional). In certain embodiments, both monofunctional and multifunctional acrylate monomers can be included in the ink formulation. The monomers can have molecular weights of between about 100 to about 600 g/mol, between about 150 to about 500 g/mol, or between about 175 to about 350 g/mol. The monomers may also have $T_g$ values of between 0° C. to about 110° C., between about 20° C. to about 100° C., or between about 30° C. to about 90° C. Exemplary monomers for use in ink formulations according to the present invention include various alkyl and cycloalkyl acrylate monomers such as: SR833S from Sartomer (a tricyclodecane dimethanol diacrylate monomer, MW=304 g/mol, $T_g$=104° C.), CD420 from Sartomer (a monofunctional acrylic monomer, MW=197 g/mol, $T_g$=29° C.), and isobornyl acrylate (MW=208.3 g/mol, $T_g$=88° C.). Generally, ink formulations made in accordance with the present invention comprise between about 30% to about 60% by weight, between about 35% to about 55%, between about 40% to about 50% by weight of said one or more monomers.

Reactive diluents are present in the ink formulation to modify the viscosity thereof. The diluent generally comprises one or more monomers that react with the other monomers and/or oligomers present in the ink formulation upon curing of the ink. The monomer may be mono-functional or multifunction (di- or trifunctional). In certain embodiments, the monomers of the diluent present molecular weights of less than about 1000 g/mol, between about 100 to about 500 g/mol, or between about 110 to about 250 g/mol. Moreover, the monomers of the diluent may exhibit $T_g$ values of between about −25° C. to about 100° C., or between about −5° C. to about 50° C., or between about 0° C. to about 35° C. Exemplary reactive diluents for use with inks made according to the present invention include N-vinylpyrrolidone (MW=111 g/mol, $T_g$=~100° C.), CD420 from Sartomer, and Genomer 1122 from Rahn (a monofunctional urethane acrylate, MW=215 g/mol, $T_g$=−3° C.). Generally, the one or more reactive diluents are present in the ink formulations at a level of between about 8% to about 30% by weight, between about 10% to about 25% by weight, or between about 12% to about 22% by weight.

Being a UV-curable, inks according to the present invention generally comprise one or more photoinitiators which absorb light energy and produces free radicals in a free radical polymerization system. Exemplary photoinitiators suitable for use with ink formulations according to the present invention include 2,4,6-Trimethylbenzoyldiphenylphosphine oxide (TPO photoinitiator from CIBA/BASF), 1-benzoyl-1-hydroxycyclohexane (IRGACURE 184 from CIBA/BASF), Ethyl-4(dimethylamino)benzoate (EDAB from Albermarle), ITX (2-isopropylthiaoxanthone), ESACURE ONE (Difunctional-alpha-hydroxy ketone photoinitiator from Lamberti), 2-methyl-1-[4-(methylthio)phenyl]-2-(4-morpholinyl)-1-propanone (IRGACURE 907). Ink formulations according to the present invention generally comprise between about 4% to about 15% by weight, between about 5% to about 13% by weight, or between about 7% to about 12% by weight of said one or more photoinitiators.

Ink formulations also include a pigment or pigment dispersion (pigment particles dispersed in a carrier fluid). The level of pigment present in the ink formulation depends largely upon the color and desired opacity of the ink. In certain applications it is desirable for the inks to be transparent, and thus have very low opacity. For example, in the creation of an automotive instrument display, a transparent colored ink (red, for example) may be printed upon a polycarbonate substrate in the pattern of a particular gauge. A transparent black ink may then be laid down on top of the gauge pattern and additional portions of the substrate as desired. In this manner, the instrument display normally appears black, but when backlight, the red transparent ink becomes visible. Alternatively, the inks used may be quite opaque. Particularly, in certain applications, it may be desirable to overcoat the printed graphics with an opaque ink, such as a white pigmented ink. Such opaque inks, especially white opaque inks, can be formulated similarly to any of the inks discussed herein.

The curable ink composition may further include one or more optional additives. These optional additives can comprise one or more viscosity modifying agents, coupling agents, surfactants or dispersants, anti-foaming agents, binders, antioxidants, photoinitiator stabilizers, fungicides, bactericides, leveling agents, opacifiers, antistatic agents, or combination thereof.

In certain embodiments, it is preferred to include a silane compound, such as an arylalkoxy silane available from Dow Corning under the name XIAMETER OFS-6124. The silane compound can be used to make inorganic surfaces hydrophobic thereby improving pigment dispersion and adhesion. The silane compound may be present in ink formulations at a level of between about 0.25% to about 5% by weight, between about 0.5% to about 2.5% by weight, or between about 0.75% to about 1.5% by weight.

Other exemplary additives that may also be included in the ink formulations described herein are a stabilizer additive available from Rahn under the product number 99-775, a chlorinated binder available from BASF under the name LAROFLEX MP 15, and siloxane surfactants such as a polyether siloxane copolymer from TEGO CHEMIE/BASF under the name TEGO 450. When used, such additives are typically present in the ink formulations at levels of less than 5% by weight.

In particular embodiments of the present invention, the ink formulations are intended for application to the substrate with an inkjet printer. Therefore, ink viscosity can be an important physical characteristic, as is pigment particle size. In certain embodiments, the inks can be jetted through heated inkjet heads. Therefore, inks made in accordance with the present invention can have viscosities of between about 8 to about 35 cp, between about 10 to about 30 cp, or between about 15 to about 25 cp at 35° C. The inks should also be jettable through 7 to 80 picoliter inkjet heads. Therefore, the pigment particles should be reduced in size sufficient to be jetted through these small inkjet nozzles without clogging or obstructing the nozzle. Viscosity can also be controlled through the addition of an alcohol having a relatively low vaporization temperature. For example, ethyl alcohol can be used in this capacity at levels of between about 1% to about 15% by weight, between about 3% to about 12% by weight, or between about 4% to about 10% by weight, as necessary.

After application to substrate 12, the inks which comprise graphics layer 14 are cured by exposure to a UV light source such as mercury vapor lamp or an LED lamp. In certain embodiments, no baking of the substrate and graphics layer is required to sufficiently cure the inks. When cured, the ink formulations exhibit excellent adhesion characteristics to the substrate. In certain embodiments, the ink, when applied and cured upon a polycarbonate substrate and subjected to a cross hatch tape test according to ASTM D-3359, incorporated by reference herein, does not delaminate from the substrate. Generally, this test method involves applying a 0.5 mil layer of the coating to the polycarbonate substrate, creating a lattice pattern of cuts in the cured coating, applying a pressure-sensitive tape over the lattice, and removing the lattice. Performance is then judged by how much, if any, of the coating was removed from the lattice by the tape. In particular embodiments according to the present invention, less than 5% of the coating is removed by the tape, and more preferably, none of the coating is removed by the tape.

In certain embodiments according to the present invention, the inks also exhibit excellent impact resistance, particularly as measured by ASTM D2794, incorporated by reference herein. In this test, a polycarbonate panel containing an ink layer (at least 0.5 mil thick) is placed beneath a vertical guide tube down which falls a weight fitted with a handle which protrudes through a vertical slot in the tube. A graduated inch-pound scale is marked along the length of the tube. The weight is raised to a certain level on the graduated tube and dropped onto the panel. The weight can be dropped onto either the coated side or the reverse side of the test panel, although impact on the reverse side general is the more severe test. The coated panel is inspected for cracking. Certain ink formulations according to the present invention, when cured on a polycarbonate substrate, do not exhibit cracking visible to the naked eye after a weight is dropped from the 180 inch-pound graduation, even when dropped onto the reverse side of the test panel.

Adhesive layer 16 generally comprises a pressure-sensitive adhesive 17, and particularly an acrylic adhesive. Layer 16 may be provided as a sheet having two removable liners (e.g., a double-sided tape). In such embodiments, one of the liners is stripped and the remaining adhesive layer 16 comprising adhesive 17 and liner or backing sheet 18 applied over graphics layer 14. In particular embodiments, the adhesive layer has a peel value of at least 60 N/100 mm, at least 70 N/100 mm, or at least 80 N/100 mm as measured according to ASTM D3330 based on a 2 mil thick layer of adhesive 72 hours after application to a polycarbonate panel and stored at room temperature. In other embodiments, the adhesive layer has a peel value of between about 60 to about 120 N/100 mm, between about 65 to about 110 N/100 mm, or between about 70 to about 100 N/100 mm as measured according to ASTM D3330 based on a 2 mil thick layer of adhesive 72 hours after application to a polycarbonate panel and stored at room temperature.

Exemplary adhesive systems include 467 MP and 468MP adhesive transfer tapes available from 3M. These adhesive transfer tapes are manufactured with different thicknesses of adhesive 17. In some embodiments, the adhesive thickness is between about 1 mil to about 8 mils, between about 2 mils to about 6 mils, or between about 2.3 to about 5.2 mils.

The graphics layer 14 generally exhibits greater adhesion to the substrate than to the adhesive 17. This is observed when removing graphics system 10 from a mount or support. In order to permanently affix system 10 to a mount or support, liner 18 is stripped to expose the adhesive 17. System 10 is then positioned on top of the support and pressed into position. If one were to attempt to separate system 10 from the support, particularly after they have been in contact for several hours or more, graphics layer 14 will not delaminate from substrate 12. In fact, what is typically observed is that a portion of adhesive 17 remains adhered to graphics layer 14, and a portion of adhesive 17 remains adhered to the support. Thus, the graphics layer 14 exhibits greater adhesion to the substrate than to the adhesive 17 as though a portion of the adhesive remains adhered to the support, the graphics layer remains intact on substrate 12.

EXAMPLES

The following examples set forth varnish and ink formulations made in accordance with the present invention. Two varnish formulations are provided. Although the various inks listed below comprise Varnish 1, Varnish 2 could be substituted for Varnish 1 in these formulations. It is to be understood that these examples are provided by way of illustration and nothing therein should be taken as a limitation upon the overall scope of the invention.

Varnish 1

| Component | Amount (wt. %) |
|---|---|
| Polyester-based polyurethane diacrylate oligomer (CN991 from Sartomer) | 23% |
| N-vinyl-2-pyrrolidone | 23% |
| Isobornyl acrylate | 19.7% |
| Tricyclodecane dimethanol diacrylate monomer (SR833S from Sartomer) | 15% |
| Stabilizer (Additive 99-775 from Rahn) | 1.3% |
| Chlorinated binder (LAROFLEX MP 15 from BASF) | 3% |
| Monofunctional acrylic monomer (CD420 from Sartomer) | 15% |

Varnish 2

| Component | Amount (wt. %) |
|---|---|
| Aromatic polyester based urethane diacrylate oligomer blended with 25% isobornyl acrylate (CN973J75 from Sartomer) | 40.75% |
| N-vinyl-2-pyrrolidone | 24% |
| Aliphatic polyester based urethane diacrylate oligomer blended with 10% 2(2-ethoxyethoxy) ethyl acrylate (CN966H90 from Sartomer) | 5% |
| Aliphatic polyester based urethane diacrylate oligomer (CN 983 from Sartomer) | 5% |
| Monofunctional urethane acrylate (GENOMER 1122 from Rahn) | 10% |
| Stabilizer (Additive 99-775 from Rahn) | 1.3% |
| Chlorinated binder (LAROFLEX MP 15 from BASF) | 8% |
| Ethyl alcohol | 25% |
| Arylalkoxy silane (XIAMETER OFS-6124 from Dow Corning) | 6% |

Yellow Ink

| Component | Amount (wt. %) |
|---|---|
| Varnish 1 | 54.25% |
| Isobornyl acrylate | 15% |
| N-vinyl-2-pyrrolidone | 4% |
| 2,4,6-Trimethylbenzoyldiphenylphosphine oxide (TPO photoinitiator from CIBA/BASF) | 3% |
| IRGACURE 184 photoinitiator from CIBA/BASF | 3.5% |
| Ethyl-4(dimethylamino)benzoate (EDAB from Albermarle) | 4% |
| Isothioxanone (photoinitiator) | 2.75% |
| Yellow Pigment Dispersion (from Polymeric Imaging) | 9% |
| Polyether siloxane copolymer (surfactant) (TEGO 450 from TEGO CHEMIE/BASF) | 1% |
| Ethyl alcohol | 3% |
| Stabilizer (Additive 99-775 from Rahn) | 0.5% |

Magenta Ink

| Component | Amount (wt. %) |
|---|---|
| Varnish 1 | 42% |
| Isobornyl acrylate | 14.28% |
| N-vinyl-2-pyrrolidone | 7% |
| 2,4,6-Trimethylbenzoyldiphenylphosphine oxide (TPO photoinitiator from CIBA/BASF) | 2.75% |
| IRGACURE 184 photoinitiator from CIBA/BASF | 3.5% |
| ESACURE ONE (Difunctional-alpha-hydroxy ketone photoinitiator from Lamberti) | 1.5% |
| Ethyl-4(dimethylamino)benzoate (EDAB from Albermarle) | 4% |
| Isothioxanone (photoinitiator) | 1.3% |
| Magenta Pigment Dispersion (from Polymeric Imaging) | 19.23% |
| Polyether siloxane copolymer (surfactant) (TEGO 450 from TEGO CHEMIE/BASF) | 1% |
| Ethyl alcohol | 3% |
| Stabilizer (Additive 99-775 from Rahn) | 0.5% |

Cyan Ink 1

| Component | Amount (wt. %) |
|---|---|
| Varnish 1 | 50% |
| Isobornyl acrylate | 14.5% |

Cyan Ink 1

| Component | Amount (wt. %) |
| --- | --- |
| N-vinyl-2-pyrrolidone | 4% |
| 2,4,6-Trimethylbenzoyldiphenylphosphine oxide (TPO photoinitiator from CIBA/BASF) | 2.75% |
| IRGACURE 184 photoinitiator from CIBA/BASF | 3% |
| Ethyl-4(dimethylamino)benzoate (EDAB from Albermarle) | 4% |
| IRGACURE 907 (photoinitiator) | 2.5% |
| Cyan Pigment Dispersion (from Polymeric Imaging) | 4.75% |
| Polyether siloxane copolymer (surfactant) (TEGO 450 from TEGO CHEMIE/BASF) | 1% |
| Ethyl alcohol | 3% |
| Stabilizer (Additive 99-775 from Rahn) | 0.5% |

Black Ink

| Component | Amount (wt. %) |
| --- | --- |
| Varnish 1 | 55% |
| Isobornyl acrylate | 15% |
| N-vinyl-2-pyrrolidone | 4% |
| 2,4,6-Trimethylbenzoyldiphenylphosphine oxide (TPO photoinitiator from CIBA/BASF) | 3% |
| IRGACURE 184 photoinitiator from CIBA/BASF | 3.5% |
| Ethyl-4(dimethylamino)benzoate (EDAB from Albermarle) | 4% |
| Isothioxanone (photoinitiator) | 3% |
| Black Pigment Dispersion (from Polymeric Imaging) | 8.5% |
| Polyether siloxane copolymer (surfactant) (TEGO 450 from TEGO CHEMIE/BASF) | 1% |
| Ethyl alcohol | 3% |
| Stabilizer (Additive 99-775 from Rahn) | 0.5% |

Cyan Ink 2

| Component | Amount (wt. %) |
| --- | --- |
| Varnish 1 | 55.95% |
| Isobornyl acrylate | 14.45% |
| N-vinyl-2-pyrrolidone | 3.85% |
| 2,4,6-Trimethylbenzoyldiphenylphosphine oxide (TPO photoinitiator from CIBA/BASF) | 2.75% |
| IRGACURE 184 photoinitiator from CIBA/BASF | 3% |
| Ethyl-4(dimethylamino)benzoate (EDAB from Albermarle) | 4% |
| IRGACURE 907 (2-methyl-1[4-(methylthio)phenyl]-2-(4-morpholinyl)-1-propanone photoinitiator) | 2.5% |
| Cyan Pigment Dispersion (from Polymeric Imaging) | 8.5% |
| Polyether siloxane copolymer (surfactant) (TEGO 450 from TEGO CHEMIE/BASF) | 1% |
| Ethyl alcohol | 3% |
| Arylalkoxy silane coupling agent (XIAMETER OFS-6124 from Dow Corning) | 1% |

Cyan Ink 3

| Component | Amount (wt. %) |
| --- | --- |
| Varnish 1 | 53.38% |
| Isobornyl acrylate | 13.95% |
| N-vinyl-2-pyrrolidone | 3.85% |
| 2,4,6-Trimethylbenzoyldiphenylphosphine oxide (TPO photoinitiator from CIBA/BASF) | 2.75% |
| IRGACURE 184 photoinitiator from CIBA/BASF | 3% |
| Ethyl-4(dimethylamino)benzoate (EDAB from Albermarle) | 4% |
| IRGACURE 907 (photoinitiator) | 2.5% |
| Cyan Pigment Dispersion (from Polymeric Imaging) | 8.5% |
| Stabilizer (Additive 99-775 from Rahn) | 0.5% |
| Polyether siloxane copolymer (surfactant) (TEGO 450 from TEGO CHEMIE/BASF) | 1% |
| Ethyl alcohol | 3% |
| Arylalkoxy silane coupling agent (XIAMETER OFS-6124 from Dow Corning) | 3.57% |

We claim:

1. A laminate graphics system comprising:
   a relatively thin substrate comprising a synthetic resin material;
   a graphics layer printed upon said substrate with at least one UV curable ink and cured, said at least one UV curable ink prior to being cured comprising—
   one or more acrylate oligomers said one or more acrylate oligomers comprising at least one oligomer having a glass transition temperature ("Tg") in the range of −50° C. to 0° C. and at least one oligomer having a Tg in the range of 0° C. to 75° C.;
   one or more reactive diluents;
   one or more acrylate monomers, said one or more acrylate monomers comprising a multifunctional acrylate monomer;
   one or more photoinitiators; and
   a pigment; and
   an adhesive layer applied over said graphics layer, said graphics layer having greater adhesion to said substrate than to said adhesive layer.

2. The graphics system according to claim 1, wherein said substrate material comprises a polycarbonate.

3. The graphics system according to claim 1, wherein said one or more acrylate oligomers comprise a multifunctional acrylate oligomer.

4. The graphics system according to claim 1, wherein said one or more reactive diluents comprise N-vinylpyrrolidone or N-vinyl caprolactam.

5. The graphics system according to claim 1, wherein said one or more acrylate monomers further comprise a monofunctional acrylate monomer.

6. The graphics system according to claim 1, wherein said adhesive layer comprises an acrylic adhesive and a removable liner material.

7. The graphics system according to claim 1, wherein said adhesive layer has a peel value of at least 60 N/100 mm as measured according to ASTM D3330 based on a 2 mil thick layer of adhesive 72 hours after application to a polycarbonate panel and stored at room temperature.

8. The graphics system according to claim 1, wherein said at least one ink, when cured upon said substrate, and subjected to a cross hatch tape test according to ASTM D-3359 does not delaminate from said substrate.

9. The graphics system according to claim 1, wherein said ink prior to curing has a viscosity of between about 8 to about 35 cp at 35° C.

10. The graphics system according to claim 1, wherein said ink prior to curing comprises:
- between about 5% to about 50% by weight of said one or more acrylate oligomers;
- between about 8% to about 30% by weight of said one or more reactive diluents;
- between about 30% to about 60% by weight of said one or more monomers; and
- between about 4% to about 15% by weight of said one or more photoinitiators.

11. A laminate graphics system comprising:
- a relatively thin substrate comprising a synthetic resin material;
- a graphics layer printed upon said substrate with at least one UV curable ink and cured, said at least one UV curable ink prior to being cured comprising—
  - one or more acrylate oligomers, said one or more acrylate oligomers comprising at least one oligomer having a glass transition temperature ("Tg") in the range of −50° C. to 0° C. and at least one oligomer having a Tg in the range of 0° C. to 75° C.;
  - one or more reactive diluents;
  - one or more acrylate monomers;
  - one or more photoinitiators; and
  - a pigment; and
- an adhesive layer applied over said graphics layer, said graphics layer having greater adhesion to said substrate than to said adhesive layer.

\* \* \* \* \*